May 26, 1964
S. TRIFILETTI
3,134,565
LICENSE PLATE MOUNTING DEVICE
Filed Jan. 15, 1962
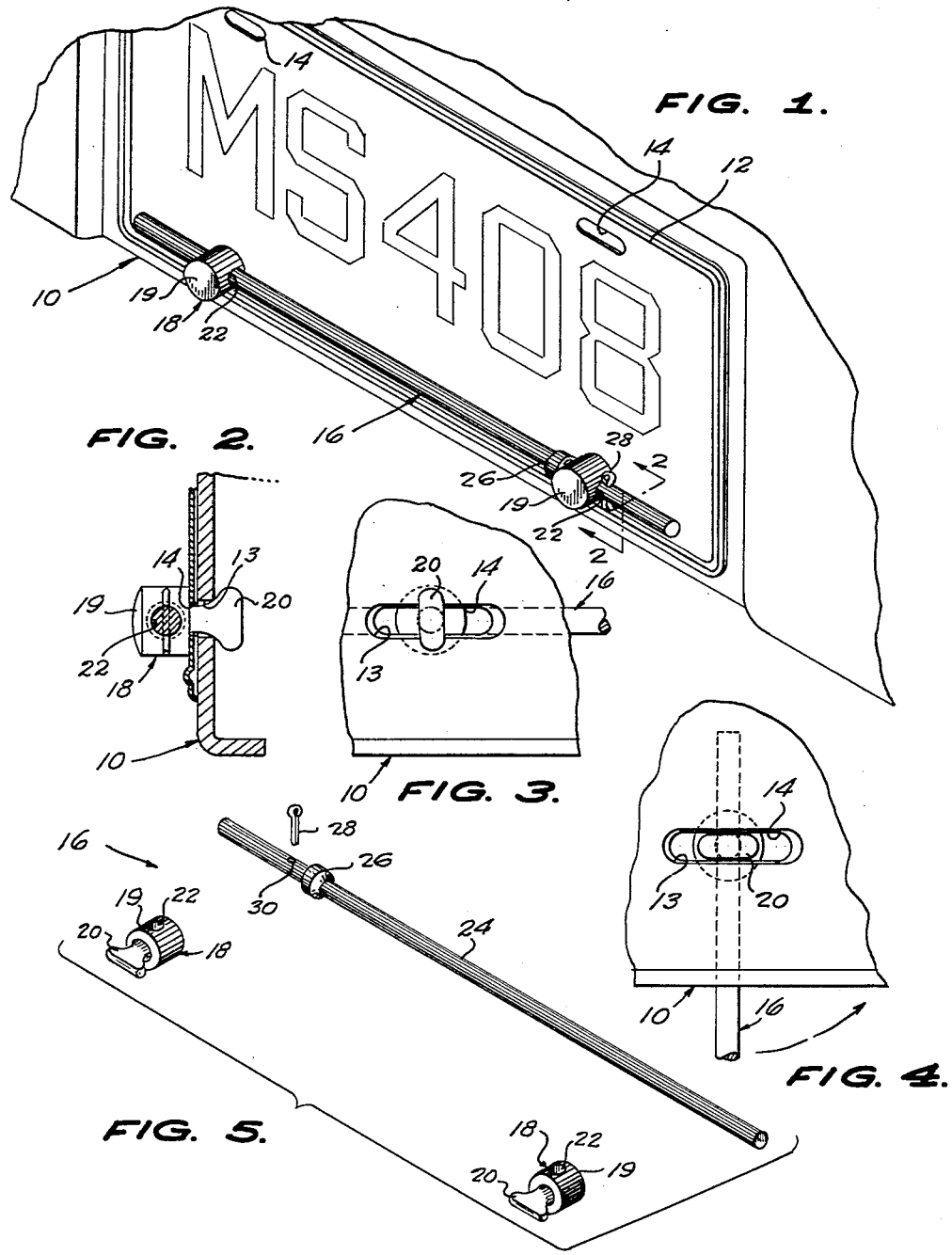
INVENTOR.
SANTY TRIFILETTI,
BY
McMorrow, Berman & Davidson
ATTORNEYS.

United States Patent Office 3,134,565
Patented May 26, 1964

3,134,565
LICENSE PLATE MOUNTING DEVICE
Santy Trifiletti, 1251 Western Ave., Albany 3, N.Y.
Filed Jan. 15, 1962, Ser. No. 166,430
4 Claims. (Cl. 248—28)

This invention relates to a mounting device whereby the license plates of all kind of vehicles can be easily and quickly mounted on or with the conventional means utilized or provided for such purpose.

Automobile license plates are conventionally mounted by means of nuts and bolts. The bolts are inserted through the slots provided in the license plates and the slots provided in the bumper or license plate bracket. The nuts are held manually for reception of the bolts, which upon sufficient tightening secure the license plates to the bumper or license plate bracket as the case may be.

After the effect of the elements upon the nuts and bolts conventionally utilized to secure the license plates, it often becomes necessary to use a cold chisel and hammer, to remove the old license plates when the time and occasion annually arises for the mounting of the new license plates, by cutting the shank portion of the bolts when the nuts and bolts have become rusted together.

In this act of removal of the old license plates much time and effort is needlessly wasted besides the possibility of injury to the automobile owner by cuts and bruises in his utilization of tools for removal of the nuts and bolts or by the old license plates themselves in his efforts at removal.

The object of this invention is to provide a mounting device to eliminate the nuts and the bolts entirely whereby the old license plates can be quickly and easily removed and a new license plate mounted just as easily and quickly.

Another object of this invention is to make a license plate mounting device as cheaply as possible thereby giving the car owner the benefit of an inexpensive and easy to handle attachment.

Further objects and advantages of the present invention will become apparent from the following description taken in conjunction with the accompanying drawing, in which:

FIGURE 1 is a perspective view showing a license plate attached to a holder provided on an automobile by means of the mounting device according to the present invention;

FIGURE 2 is a fragmentary sectional view taken on the line 2—2 of FIGURE 1;

FIGURE 3 is a back view of the assembly of FIGURE 2 showing the tongue after full insertion in the registering slots of the license plate and holder therefor and turned so that it is vertical with respect to the slots;

FIGURE 4 is a back view of the assembly of FIGURE 2, but showing the tongue after full insertion in the registering slots of the license plate and holder, but before being turned to the vertical position with respect to the slots, the arrow indicating the direction of rotational movement to shift the tongue to the vertical position; and FIGURE 5 is an exploded view of the mounting device according to the present invention.

Referring to the drawing, the numeral 10 designates a license plate holder provided on an automobile, in this instance, a bumper, the bumper being provided with a frame structure having a pair of longitudinally-spaced lower slots 13 and a pair of longitudinally-spaced upper slots, not shown. A license plate 12 is disposed in an upright position, FIGURE 1, so that it abuts against the holder or framework of the bumper with the lower pair of slots 14 in registry with the lower pair of slots 13 in the holder or framework on the bumper 10.

A mounting device indicated generally by the numeral 16 secures the license plate 12 to the framework or holder on the bumper 10. The device comprises at least one pair of attaching elements 18, each of the elements 18 embodying a block 19, cylindrical in form, and a tapered flat tongue 20 disposed on one side of and longitudinally of the block and has the smaller end attached to the block with the larger end spaced from the block, as clearly shown in FIGURE 5. The block 19 is provided with a hole 22 which extends transversely therethrough, as also clearly shown in FIGURE 5. Tongues 20 of the elements 18 are inserted through registering slots 14 of the license plate 12 and 13 of the framework of bumper 10. When fully inserted the tongues 20 are wholly in the back of the framework of bumper 10 and in alignment with the slots, with the block 19 in front of and bearing against the front face of the license plate 12, as will be apparent from FIGURE 4. After full insertion, the implements 18 are each rotated in the direction indicated by the arrow in FIGURE 4 until the tongues 20 are vertical with respect to the adjacent registering slots 14 and 13 in the license plate and the framework of the bumper 10, the holes of the blocks 19 of the pair of elements 18 in alignment, and the smaller ends of the tongues 20 bearing against the bumper 10, as shown in FIGURES 1, 2 and 3. A holding member embodying an elongated rod 24 is projectible through and is releasably supported in the aligned holes 22 in the block 19 of the pair of elements 18.

The holding member or rod 24 is provided with a stop means or shoulder or collar 26 which serves to prevent projection of the rod out of the aligned holes 22 of the block 19 of the pair of elements 18.

The holding member or rod 24 is secured in fixed position of support upon the blocks 19 of the pair of elements 18 by a locking element or cotter pin 28 releasably engaging means or an aperture 30 provided in the rod 24.

It is to be understood that the forms of my invention herewith shown and described are to be taken as preferred example of same, and that various changes in shape, size and arrangement of parts may be resorted to without departing from the spirit of the invention or the scope of the subjoined claims.

I claim:

1. In combination, a license plate holder having a pair of longitudinally-spaced lower slots, a license plate provided with a lower pair of slots disposed so that it abuts against said holder with the lower pair of slots in registry with the lower pair of slots in said holder, and a mounting device for securing said license plate to said holder, said device comprising at least one pair of separate and individual attaching elements, each element embodying a block and a tapered flat tongue disposed on one side of and longitudinally of said block and having the smaller end attached to said block with the larger end spaced from said block, said block being provided with a hole extending transversely therethrough, the tongues of said elements being fully inserted through the registering slots in said license plate and holder, said elements after full insertion of their tongues in the registering slots being rotated to positions wherein the tongues are vertical with respect to the adjacent registering slots, the holes in the blocks are in alignment, and the smaller ends of the tongues are in engagement with the holder, and a holding member projectible through and releasably supported in the aligned holes in the blocks for retaining the elements in position within the registering slots of the license plate and holder.

2. The mounting device according to claim 1 in which said holding member embodies an elongated rod which is projectible through and releasably supported in the aligned holes in the blocks.

3. The mounting device according to claim 2 which includes in addition stop means on said rod for preventing removal from the aligned holes in the blocks after the rod has been projected through and supported in the aligned holes in the blocks.

4. The mounting device according to claim 3 which includes in addition a locking element releasably engageable with means provided on said rod for securing the rod in fixed position of support upon the blocks of said attaching elements.

References Cited in the file of this patent
UNITED STATES PATENTS

| | | |
|---|---|---|
| 1,218,103 | Moffat | Mar. 6, 1917 |
| 2,270,814 | Scribner | Jan. 20, 1942 |
| 2,564,986 | Meyer | Aug. 21, 1951 |